United States Patent
Ishida

(10) Patent No.: US 9,290,060 B2
(45) Date of Patent: Mar. 22, 2016

(54) MOTORCYCLE TIRE FOR ROUGH TERRAIN

(75) Inventor: Shingo Ishida, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 701 days.

(21) Appl. No.: 13/336,471

(22) Filed: Dec. 23, 2011

(65) Prior Publication Data

US 2012/0160381 A1 Jun. 28, 2012

(30) Foreign Application Priority Data

Dec. 27, 2010 (JP) ................................ 2010-290855

(51) Int. Cl.
*B60C 11/11* (2006.01)
*B60C 11/03* (2006.01)
*B60C 11/13* (2006.01)

(52) U.S. Cl.
CPC .............. *B60C 11/11* (2013.01); *B60C 11/032* (2013.04); *B60C 11/1392* (2013.04); *B60C 2200/10* (2013.04); *B60C 2200/14* (2013.04)

(58) Field of Classification Search
CPC ............ B60C 2200/10; B60C 2200/14; B60C 11/0306; B60C 11/0309; B60C 11/11; B60C 11/1376; B60C 2011/0351; B60C 11/032; B60C 11/1384; B60C 11/1392
USPC ................ 152/209.11, 209.1, 209.12, 209.8, 152/209.9, 209.15, 209.16, 209.17; D12/536, 571, 579, 577, 510, 511, 542, D12/512, 544
IPC ....................................................... B60C 11/11
See application file for complete search history.

(56) References Cited

U.S. PATENT DOCUMENTS

| | | | | |
|---|---|---|---|---|
| 3,842,879 A | * | 10/1974 | Mills et al. | 152/209.11 |
| 4,617,976 A | * | 10/1986 | Kawajiri | 152/209.11 |
| D392,225 S | * | 3/1998 | Lo | D12/536 |
| D521,925 S | * | 5/2006 | Matsumura et al. | D12/536 |

(Continued)

FOREIGN PATENT DOCUMENTS

| | | | | |
|---|---|---|---|---|
| EP | 368582 A2 | * | 5/1990 | B60C 11/11 |
| JP | 07323706 A | * | 12/1995 | B60C 11/11 |

(Continued)

OTHER PUBLICATIONS

Dirtrax Staff, Dunlop Quadmax Sport: Appearing on Podiums Soon, Oct. 4, 2007 as accessed from http://www.atvmag.com/article.asp?nid=844.*

(Continued)

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A motorcycle tire 1 on rough terrain. Blocks 11 include crown blocks 16 arranged in a center area Cr of a tread portion 2, middle blocks arranged axially outside the crown blocks and shoulder blocks arranged axially outside middle blocks. The crown blocks have a smallest aspect ratio. The shoulder blocks have a largest aspect ratio. The crown block 16 includes a shift block. The shift block is provided in a center part in its widthwise direction with one circumferentially extending slit so as to divide the block into two small block segments. The two small block segments are shifted from each other in the tire circumferential direction.

18 Claims, 5 Drawing Sheets

(56) References Cited

U.S. PATENT DOCUMENTS

| | | | | |
|---|---|---|---|---|
| D593,933 S | * | 6/2009 | Sueishi | D12/536 |
| D648,260 S | * | 11/2011 | Ishida | D12/571 |
| 2002/0026971 A1 | * | 3/2002 | Matsumura | 152/209.21 |
| 2008/0245457 A1 | | 10/2008 | Sueishi | |
| 2009/0107599 A1 | * | 4/2009 | Lamb | 152/209.8 |
| 2011/0024009 A1 | * | 2/2011 | Nakamura | 152/209.1 |
| 2011/0308681 A1 | * | 12/2011 | Nakamura | 152/209.18 |

FOREIGN PATENT DOCUMENTS

| | | | | |
|---|---|---|---|---|
| JP | 2008-254573 A | | 10/2008 | |
| WO | WO2009/104672 | * | 8/2009 | B60C 11/04 |
| WO | WO 2010070921 A1 | * | 6/2010 | B60C 11/11 |

OTHER PUBLICATIONS

Machine translation of JP07-323706 (no date).*

* cited by examiner

MOTORCYCLE TIRE FOR ROUGH TERRAIN

BACKGROUND OF THE INVENTION

1. Field of the Invention

The present invention relates to a motorcycle ti re for driving on rough terrain which can improve turning performance while maintaining traction performance or braking performance when it travels straight.

2. Description of the Background Art

A motorcycle tire for driving on rough terrain which is used in motocross and the like (which may be hereinafter simply referred to as a "tire") has a plurality of blocks formed on a tread portion (see Japanese Patent Application Publication No.2008-254573). Such a tire has each block bite into a soft road such as a sandy soil, a mud area and the like, obtains traction or turning force by its edges, thereby improving steering stability.

In addition, blocks include crown blocks arranged in a center area of a tread portion, shoulder blocks arranged on tread edge sides, and middle blocks arranged between the crown blocks and the shoulder blocks. Of these blocks, the crown block is formed into a horizontally long rectangular shape in a planar view, which can enhance edge components in an axial direction of a tire, to improve traction performance or braking performance when a motorcycle travels straight.

SUMMARY OF THE INVENTION on a soft road, as each block considerably bites into it, most of the crown blocks during turning contacts the ground. There was a problem that with such a crown block, the turning performance could not be adequately improved as there were fewer edge components in a circumferential direction of the tire.

In addition, it is possible that the edge components are enhanced in the tire circumferential direction by increasing tire circumferential length of the crown block. However, there was another problem that a ground-contacting area then increased excessively, and biting into a soft road became smaller, thereby degrading the traction performance or braking performance when a motorcycle traveled straight.

The present invention has been devised in light of the actual situation described above, and a primary object of the present invention is to provide a motorcycle tire for driving on rough terrain which can improve turning performance while maintaining traction performance or braking performance when a motorcycle travels straight, basically by making a block aspect ratio of a crown block smallest and that of a shoulder block largest, dividing the crown block into small block segments by providing one slit on the crown block, and making the crown blocks include shift blocks having two small block segments shifted in the tire circumferential direction.

According to the present invention, A motorcycle tire for rough terrain comprises a tread portion provided with a plurality of blocks, said blocks including crown blocks arranged in a center area of the tread portion, middle blocks arranged axially outside the crown blocks and shoulder blocks arranged axially outside middle blocks, the crown blocks having a smallest aspect ratio and the shoulder blocks having a largest aspect ratio, wherein the aspect ratio of the block is defined as a ratio (L/W) of the circumferential length L to the axial width W of the block, the crown blocks including a shift block, wherein the shift block is provided in a center part in its widthwise direction with one circumferentially extending slit so as to divide the block into two small block segments, and the two small block segments are shifted from each other in the tire circumferential direction.

In addition, in the specification, unless otherwise stated, dimension of each portion of the tire shall be a value specified when a tire is in unloaded standard condition in which it is fixed to a standard wheel rim and inflate to a standard pressure.

The standard wheel rim is a wheel rim officially approved for the tire by standard organization, i.e. JATMA (Japan and Asia), T&RA (North America), ETRTO (Europe), STRO (Scandinavia) and the like. The standard rim is the "standard rim" specified in JATMA, the "Measuring Rim" in ETRTO, and the "Design Rim" in TRA or the like.

The standard pressure is an air pressure for tire specified by the standard organization above. For example, the standard pressure is the "maximum air pressure" in JATMA, the "Inflation Pressure" in ETRTO, and the maximum pressure given in the "Tire Load Limits at various cold Inflation Pressures" table in TRA or the like.

DESCRIPTION OF THE PREFERRED EMBODIMENTS

An embodiment of the present invention will be described hereinafter based on the drawings.

Figure 1:
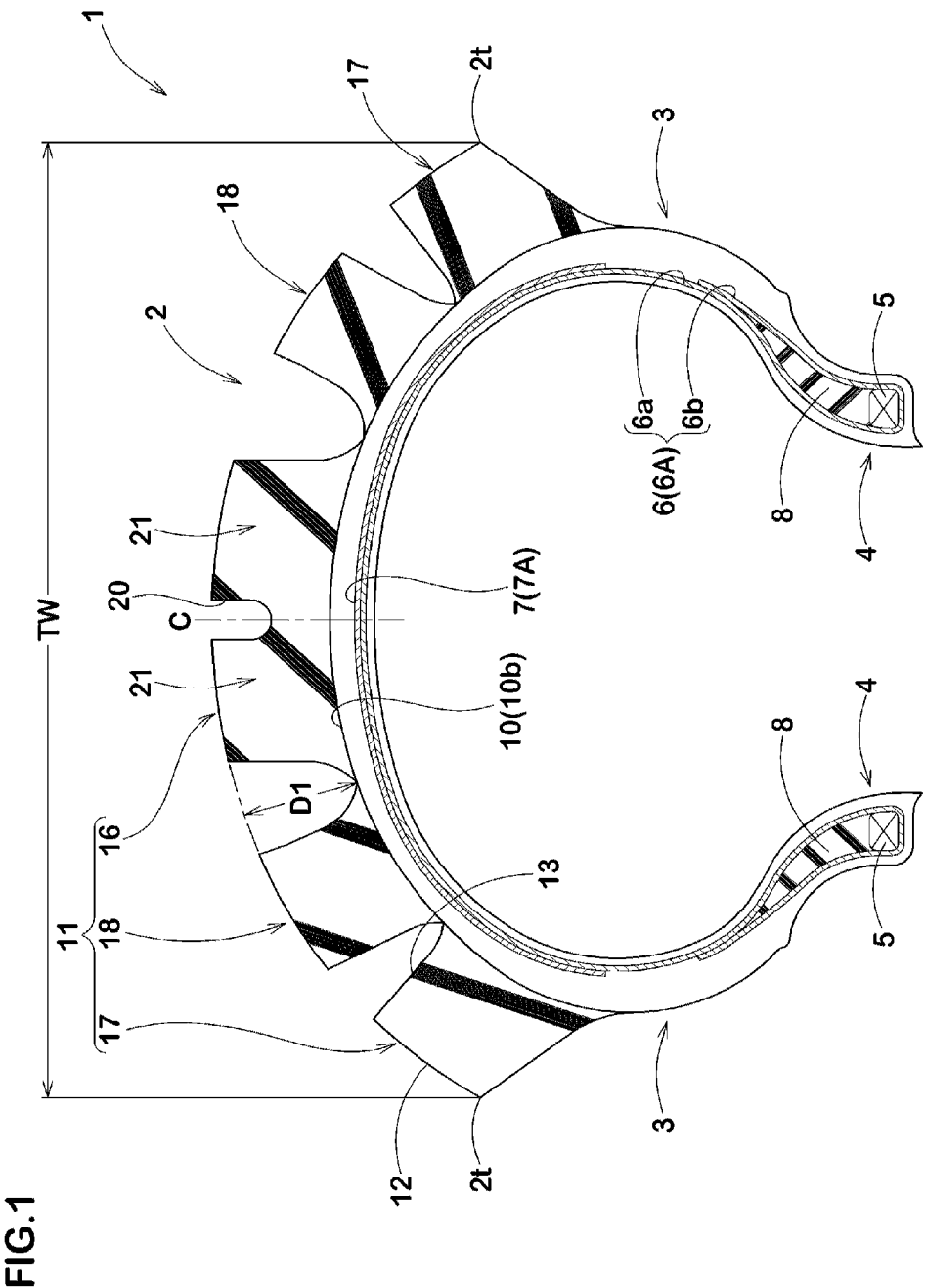
FIG. 1 is a cross sectional view of a motorcycle tire for driving on rough terrain of the embodiment.

As shown in FIG. 1, as a motorcycle tire 1 for driving on rough terrain of the present invention, a tire for motocross competitions designed to be able to show the best performance on a soft road such as sandy soil or a mud area is exemplified.

The tire 1 has a tread portion 2, a pair of side wall portions 3, 3 extending radially inwardly from both sides thereof, and bead portions 4, 4 located at inner ends of respective side wall portions 3 in a tire radial direction and fixed to a rim (not shown). The tire 1 is also reinforced by including a toroid-shaped carcass 6, and a tread reinforcing layer 7 arranged on an outer side of the carcass 6 in the ti re radial direction and inside the tread portion 2.

The tread portion 2 has its outer surface convexly bend to the axially outwardly, and a tread width TW which is a tire axial distance between tread edges 2t, 2t of the tread portion 2 constitutes maximum tire width.

The carcass 6 is formed of one or more carcass ply 6A—one carcass ply 6A in the embodiment—having a main portion 6a which toroidally spans between a pair of bead cores 5, 5 and a turnup portion 6b connecting to both sides of the main portion 6a and turned up around the bead core 5 from the axially inside to axially outside of the ti re. In addition, between the main portion 6a and the turnup portion 6b of the carcass ply 6A is arranged a bead apex 8 formed of hard rubber extending radially outwardly from the bead core 5, so that the bead portion 4 is reinforced, as appropriate.

As the carcass ply 6A of the embodiment, for example, a radially structured carcass is adopted on which carcass cords of organic fibers are arranged at an angle of 75 to 90 degrees with respect to the tire circumferential direction. In addition, as a carcass 6, a bias structured carcass may be adopted on which two or more carcass plies are used, and carcass cords are tiltingly arranged at an angle of 15 to 45 degrees, for example, with respect to the tire circumferential direction.

The tread reinforcing layer 7 comprises, for example, one or more—one in the embodiment—reinforcing ply 7A on which reinforcing cords of organic fibers are tiltingly arranged at an angle of 15 to 45 degrees with respect to the tire circumferential direction.

On the tread portion 2 of the embodiment is formed a plurality of blocks 11 which rise radially outwardly from a groove bottom 10b of a tread groove 10. The blocks 11 are formed to include a tread surface 12, and a block wall surface 13 extending radially inwardly from the tread surface 12 to the groove bottom 10b and defining a block contour. The block wall surface 13 includes lateral wall surfaces 29 disposed on both sides, in the tire circumferential direction of one of the two small block segments. In addition, as shown in FIG. 1, the groove bottom 10b forms a smooth surface along the outer surface of the carcass 6 and depth of the groove D1 is set to 9 to 16 mm, for example.

Figure 2:
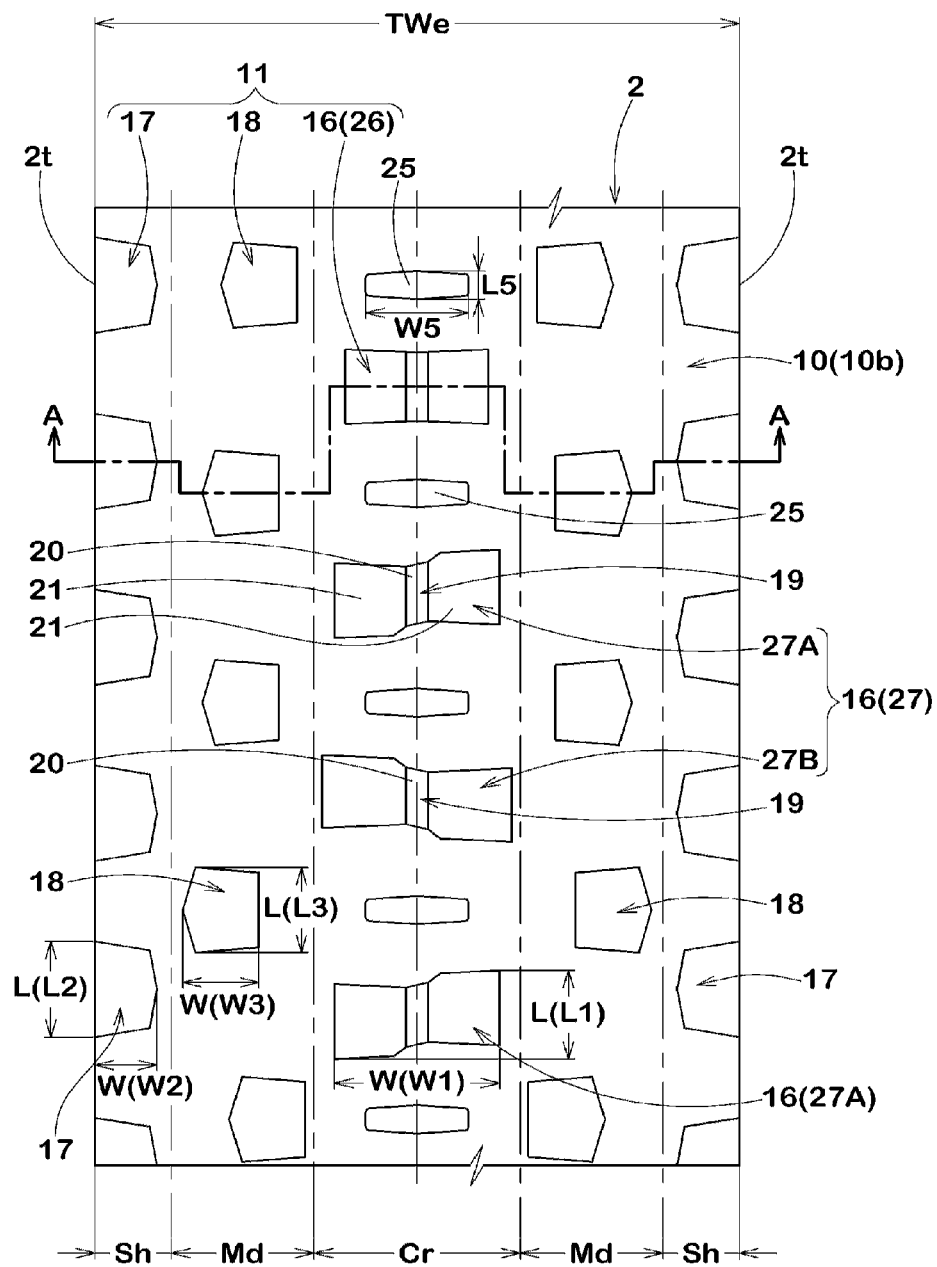
FIG. 2 is a development view of a tread portion of FIG. 1.

In addition, as shown in FIG. 2, the blocks 11 are arranged sparsely, being spaced in the circumferential and axial directions of the tire. Such an arrangement of the blocks 11 can increase amount of biting of the blocks 11 into a soft road and achieve high driving force. In addition, as the tread grooves 10 separating the blocks 11 are formed to be wide, clogging of mud and the like can be prevented.

Such a sparse arrangement of the blocks 11 is understood by a land ratio (Sb/S), which is a ratio of a total sum Sb of area of the tread surface 12 of all the blocks 11 to a total sum of all areas S of the outer surface of the tread portion 2 (total area of the outer surfaces of the tread portion 2 when it is assumed that all the tread grooves 10 are embedded). When the land ratio (Sb/S) becomes excessively small, the driving force may degrade on a hardened hard road or medium road. In contrast, when the land ratio is too large, the driving force may degrade on a soft road. From such a standpoint, the land ratio (Sb/S) is preferably in the range of 6 to 30%.

In addition, as shown in FIG. 2, the block 11 of the embodiment includes crown blocks 16 most of which are located in a center area Cr, which is an area of 25% of a developed width TWe of the tread portion with a tire equator C of the tread portion 2 as a center, shoulder blocks 17 most of which are located in an end area Sh, which is an area of 12.5% of the developed width TWe of the tread portion from the tread edge 2t, and middle blocks 18 most of which are located in an intermediate area Md, which is an area between the center area Cr and the end area Sh. These blocks 16, 17, 18 are spaced in the tire circumferential direction. In addition, "most of which are located" means that not less than 80% of the surface area of the tread surface 12 of respective blocks 16, 17, 18 are located in respective areas Cr, Sh, Md.

The crown block 16 is formed into a horizontally long rectangular shape whose aspect ratio, which is a ratio (L/W) of the tire circumferential length L to the tire axial width W, is smallest when compared with other blocks 17, 18, specifically, whose tire axial width W1 is large. Such a crown block 16 can enhance edge components in the tire axial direction and thus can improve traction performance or braking performance when a motorcycle travels straight.

In order to effectively achieve the function described above, it is desirable that the aspect ratio (L1/W1) of the crown block 16 is preferably not less than 30%, and more preferably not less than 35%, but preferably not more than 70%, and more preferably not more than 65%. similarly, it is desirable that the width W1 of the crown block 16 is preferably not less than 20% of the developed width TWe of the tread portion, and more preferably not less than 25%, but preferably not more than 40%, and more preferably not more than 35%.

In addition, the shoulder block 17 is formed into a vertically long rectangular shape whose aspect ratio is largest when compared with other blocks 16, 18, specifically, whose tire circumferential length L2 is large. Such a shoulder block 17 can enhance the edge components in the tire circumferential direction and improve turning performance. Preferably, it is desirable that the aspect ratio (L2/W2) of the shoulder block 17 is about 120 to 180%, and the length L2 is about 7 to 24% of the developed width TWe of the tread portion.

The middle block 18 has the aspect ratio set larger than that of the crown block 16 and smaller than that of the shoulder block 17, and is formed into a vertically long rectangular shape whose tire circumferential length L3 is slightly larger than the tire axial width W3, in the embodiment. Such a middle block 18 achieves the edge components in the tire axial and circumferential directions in a balanced manner and is useful in improving performance of straightforward movement and the turning performance in a balanced manner. Preferably, it is desirable that the aspect ratio (L3/W3) of the middle block 18 is about 85 to 145% and the length L3 is about 8 to 25% of the developed width TWe of the tread portion.

Figure 3A:
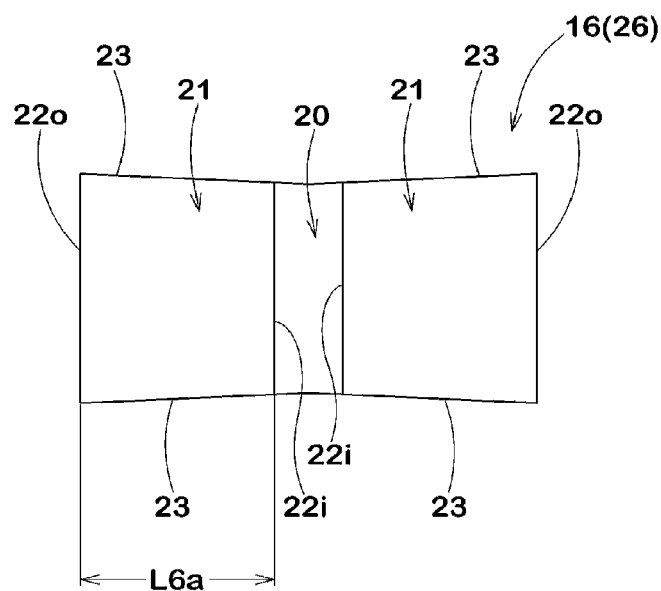
FIG. 3A is a plan view of a parallel block.
Figure 3B:
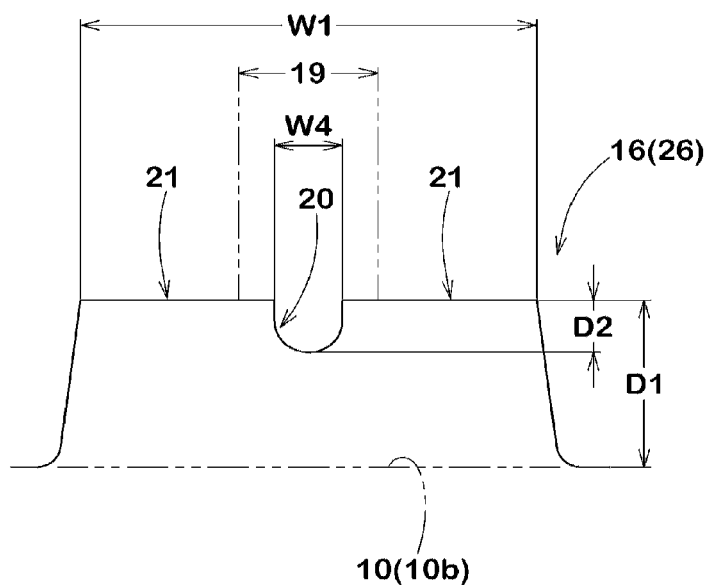
FIG. 3B is a front view of FIG. 3A.

Then, the crown block 16 is divided into two small block segments 21, 21 by one circumferentially extending slit 20 in a center portion 19 of its widthwise direction to the tire circumferential direction. With this, as shown in FIG. 3A, the two small block segments 21, 21 have circumferentially extending inner edges 22i circumferentially extending on the slit 20 side, circumferentially extending outer vertical edges 22o mutually facing the circumferentially extending inner edges 22i in the tire axial direction and extending in the circumferential direction, and axially extending edges 23, 23 extending between the circumferentially extending inner edge 22i and the circumferentially extending outer vertical edge 22o in the tire axial direction, and each of the small block segments is formed almost like a rectangle in planar view. In addition, as shown in FIG. 3B, the center area 19 is an area which is 30% of the width w1 and has an intermediate position of the width W1 of the crown bock 16 as a center. In the embodiment, the slit 20 passes through the intermediate position of the width W1.

Thus, dividing the crown block 16 into the two small block segments 21, 21 can reduce block rigidity and improve tracking-to-road-surface performance when a motorcycle runs straight, thus enabling improvement of the traction performance and the braking performance. In addition, the slit 20 can guide a water film or mud to the tire circumferential direction on a hard road surface and a medium road surface, which contributes to improvement in drainage and mud discharge.

In addition, as shown in FIG. 3B, when width W4 of the slit 20 is small, the road surface tracking performance may not be adequately improved. In contrast, when the width W4 is large, the block rigidity of the crown blocks 16 excessively degrades, and thus the traction performance or the braking performance when the motorcycle travels straight may deteriorate. From such a standpoint, it is desirable that the width W4 is preferably not less than 5% of the width W1 of the crown block 16, and more preferably not less than 10%, but preferably not more than 25%, and more preferably not more than 20%. Similarly, groove depth D2 of the slit 20 is preferably 5% or more of the groove depth D1 and more preferably 15% or more, and preferably 50% or less and more preferably 40% or less.

As shown in FIG. 2, in the embodiment, an almost horizontally long, rectangular concave portion 25, which is made by locally depressing the groove bottom 10b, is provided on the groove bottom 10b of the tread groove 10 between the circumferentially adjacent crown blocks 16. Such a concave portion 25 can further improve the tracking-to-road-surface performance of the tread surface 12 of the crown block 16, by locally and flexibly deforming the tread portion 2. Preferably, it is desirable that maximum width W5 of the concave portion 25 in the tire axial direction is, for example, about 8 to 28% of the developed width TWe of the tread portion, maximum length L5 thereof in the tire circumferential direction is about 25 to 50% of the maximum width W5, and depth (not shown) is about 0.5 to 1.5 mm.

The crown blocks 16 in the embodiment also include a parallel block 26 in which two adjacent small block segments 21, 21 are not shifted from each other in the tire circumferential direction, and a shift block 27 in which two adjacent small block segments 21, 21 are shifted from each other in the tire circumferential direction.

As shown in FIG. 3A, for the parallel block 26, axially extending edges 23, 23 are continuously arranged in the tire axial direction in the two adjacent small block segments 21, 21. Such a parallel block 26 can effectively enhance the edge components in the tire axial direction, and improve the traction performance or the braking performance when the motorcycle travels straight. In addition, the parallel block is provided in a center part in its widthwise direction with one circumferentially extending slit so as to divide the block into two small block segments.

Figure 4A:
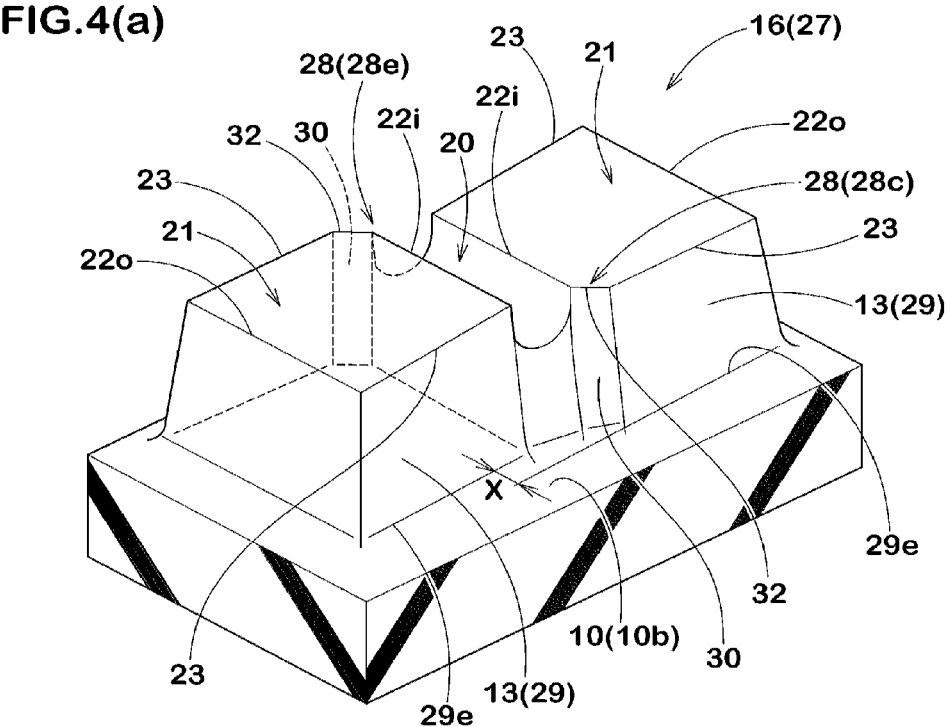
FIG. 4A is a perspective view of a shift block.
Figure 4B:
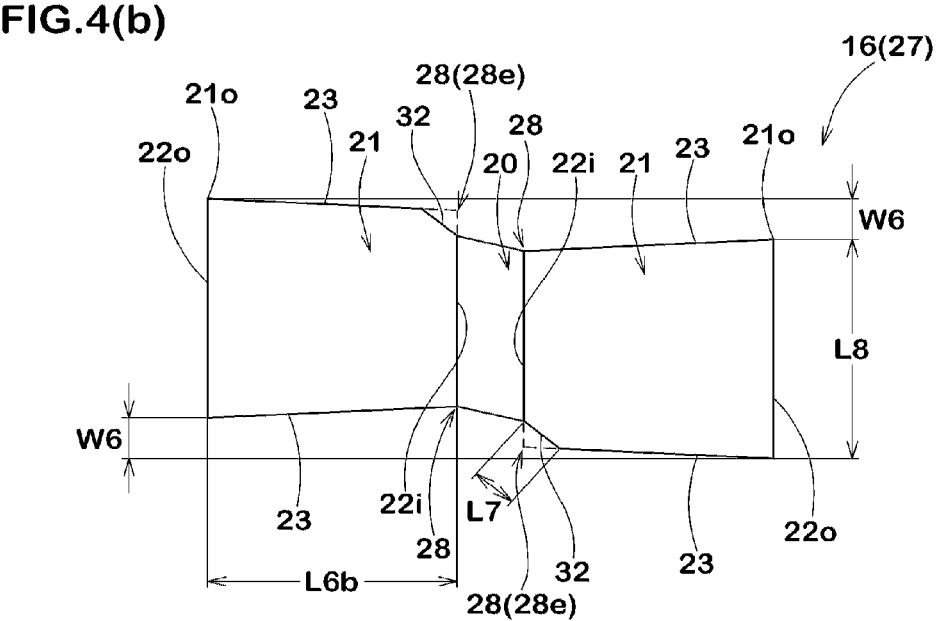
FIG. 4B is a plan view of FIG. 3B.

On the one hand, as shown in FIG. 4A, 4B, in the shift block 27 of the embodiment, the circumferentially extending inner edge 22i, the circumferentially extending outer vertical edge 22o, and the axially extending edge 23 are arranged, respectively, being shifted in the tire circumferential direction in the two adjacent small block segments 21, 21. With this, for the shift block 27, of the corner portions 28 with the circumferentially extending inner edge 22i and the axially extending edge 23, external corner 28e protruding on both sides in the ti re circumferential direction to be external corners of the shift blocks 27 are formed, respectively.

Such a shift block 27 can improve the turning performance, as during turning, the circumferentially extending inner edge 22i forming the external corner 28e can increase the edge components in the tire circumferential direction. Furthermore, as the shift block 27 can enhance the edge components in the tire circumferential direction without increasing a ground-contacting area, the traction performance or the braking performance when the motorcycle travels straight can be maintained.

In addition, if amount of circumferential shift W6 between the two small block segments 21, 21 is small, the edge components in the tire circumferential direction may not be adequately increased. In contrast, if the amount of circumferential shift W6 is large, the axially extending edges 23, 23 forming the edge components in the ti re axial direction of respective small block segments 21, 21 are widely spaced in the tire circumferential direction, and thus the traction performance and the braking performance may degrade. From such a standpoint, it is desirable that the amount of circumferential shift W6 is preferably not less than 5% of the ti re circumferential length L1 (shown in FIG. 2) of the shift block 27 (crown block 16), and more preferably not less than 10%, but preferably not more than 35%, and more preferably not more than 30%.

The "amount of circumferential shift W6" shall be tire circumferential length between outermost end points 21o, 21o (in the embodiment, the corner portion of the circumferentially extending outer vertical edge 22o and the axially extending edge 23) of the two adjacent small block segments 21, 21 in the tire circumferential direction. In addition, if the amount of circumferential shift W6 differs on both sides of the ti re circumferential direction, it shall be the maximum amount thereof.

In addition, if the number Gs of shift blocks 27 is small, the function described above may not be adequately improved. In contract, if the number Gs is large, the traction performance or the braking performance when the motorcycle travels straight may not be adequately improved. From such a standpoint, it is desirable that the number Gs is preferably not less than 40% of a total number Gt of the crown blocks 16 (the number Gs+number Gp of parallel blocks 26), and more preferably not less than 50%, but preferably not more than 90%, and more preferably not more than 80%.

As shown in FIG. 2, preferably, the shift blocks 27 are included first shift block 27A and second shift block 27B which are different from each other in the direction of the circumferential shift. Such shift blocks 27A, 27B alleviate any bias of the edge components in the tire circumferential and axial directions which easily occurs due to a positional offset direction of the small block segments 21, 21, and thus can improve the traction performance or the braking performance when the motorcycle travels straight, and the turning performance in a balanced manner.

Furthermore, it is preferred that the second shift block 27B or alternatively the parallel block 26 is disposed adjacently to the first shift block 27A in the tire circumferential direction. similarly, it is preferred that the first shift block 27A or alternatively the parallel block 26 is disposed adjacently to the second shift block 27B. With this, as continuous arrangement of the first shift block 27A and the second shift block 27B in the tire circumferential direction is prevented, the crown blocks 16 can effectively prevent any bias of the edge components in the circumferential and axial directions of the tire. In addition, for the parallel block 26 in which each edge component does not bias in a direction, it is needless to say that they can be continuously provided in the tire circumferential direction.

In order to prevent the bias of such edge components more effectively, it is desirable that the number Gs1 of the first shift blocks 27A and the number Gs2 of the second shift blocks 27B are identical.

In addition, it is preferred that the tire axial length L6b (as shown in FIG. 4B) of the small block segment 21 of the shift block 27 of the embodiment is larger than the tire axial length L6a (as shown in FIG. 3A) of the small block segment 21 of the parallel block 26. With this, the shift block 27 can increase the edge components in the tire axial direction which tend to degrade due to be circumferentially shifted of the small block segments 21, 21, thereby enabling improvement of the traction performance and the braking performance.

In addition, if the length L6b of the small block segment 21 of the shift block 27 is small, the function described above may not be adequately obtained. In contrast, if the length L6b is large, the ground-contacting area of the small block segment 21 increases, and thus the block may not be able to adequately bite into a soft road surface. From such a standpoint, it is desirable that the length L6b is preferably not less than 100% of the length L6a of the small block segment 21 of the parallel block 26, and more preferably not less than 120%, but preferably not more than 150%, and more preferably not more than 140%.

It is preferred that the circumferential length L8 of each of the two small block segments 21, 21 is gradually increased toward the outside in the widthwise direction of the block from the slit 20 side. Such small block segments 21 can incline the axially extending edge 23 to the tire axial direction, have the edge components to the tire axial direction, and is useful in improving the turning performance.

In addition, as shown in FIG. 4A, in the shift block 27, it is preferred that radially inner edges 29e of the lateral wall surfaces 29 of one of the two small block segments 21 are circumferentially shifted (by amount of circumferential shift x in the embodiment) from radially inner edges 29e of the lateral wall surfaces 29 of the other small block segment 21. Its shifting direction is the same as the axially extending edge 23. This enables formation of a protruding wall surface 30 which sticks out to the side of the external corner 28e and is large resistance to a soft road surface during turning, and thus the small block segment 21 can effectively improve the turning performance.

Furthermore, since such a protruding wall surface 30 can shovel mud or sand during turning and efficiently introduce them into the slit 20, it can prevent excessive sinking on a soft road. In addition, the radially inner edge 29e of the lateral wall surface 29 shall be an intersecting part of the lateral wall surface 29 and the groove bottom 10b, and identified with no chamfering if the chamfering or the like is provided between the lateral wall surface 29 and the groove bottom 10b.

Furthermore, it is desirable that each of the two small block segments 21 is provided on the external corner 28e with a chamfered portion 32. Such a chamfered portion 32 can form an inclined edge which can achieve the edge components to the tire circumferential and axial directions, and improve the turning performance. In addition, the chamfered portion 32 improves rigidity of the external corner 28e which is subjected to large lateral force from a soft road, and can prevent occurrence of any uneven wear or crack and the like.

In addition, if chamfering length L7 (as shown in FIG. 4B) of the chamfered portion 32 is small, the function described above cannot be achieved. In contrast, if the chamfering length L7 is large, the edge components in the tire axial direction degrade, and the traction performance and the braking performance may not be adequately provided. From such a standpoint, the chamfering length L7 is preferably 1.0 mm or more and more preferably 2.0 mm or more, and preferably 5.0 mm or less and more preferably 4.0 mm or less.

Although the particularly preferred embodiments of the present invention have been described above in detail, the present invention is not limited to the embodiments as shown, and can be modified into various embodiments and implemented.

Figure 5:
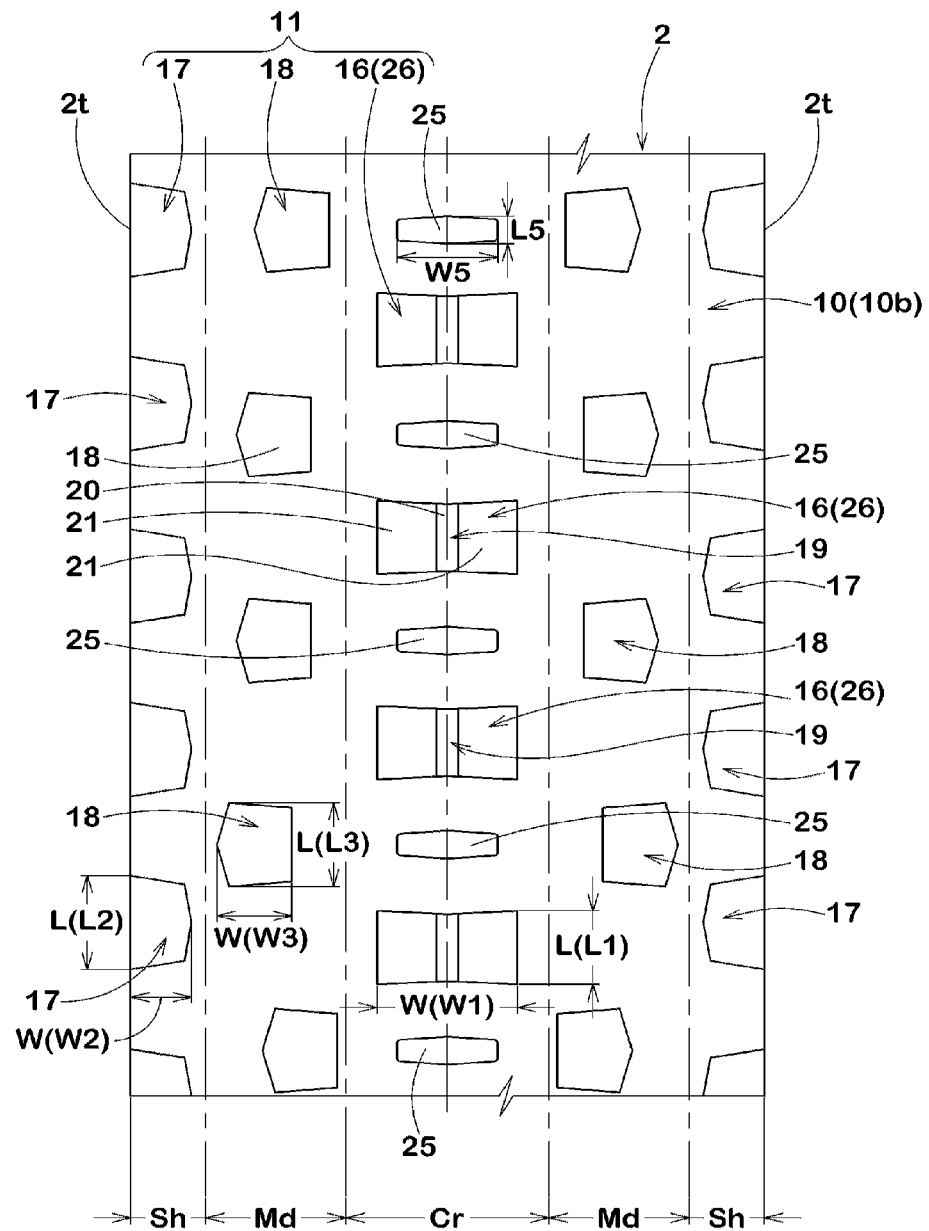
FIG. 5 is a development view of a tread portion of a comparison example.

Comparative Test:

Tires basically structured as shown in FIG. 1 and having shift blocks as shown in Table 1 were manufactured and their performance was evaluated. In addition, for comparison, tires having no shift blocks, as shown in FIG. 5, were also manufactured and similarly evaluated. Shown below are common specifications:

Tire size:
  Front wheel: 90/100-21
  Rear wheel: 120/80-19
Rim size:
  Front wheel: 1.60×21
  Rear wheel: 2.15×19
Tread width TW: 145 mm
developed width TWe: 175 mm
Groove depth D1: 15 mm
Land ratio (Sb/S): 25%
Concave portion:
  Maximum width in the tire axial direction W5: 32 mm
  Maximum length in the tire circumferential direction L5: 12 mm
  Depth: 0.5 mm
  Ratio (W5/TWe): 18.3%
  Ratio (L5/W5): 37.5%
Crown block:
  Tire circumferential length L1: 20 mm
  Tire axial width W1: 40 mm
  Aspect ratio (L1/W1): 0.5%
  Ratio (W1/TWe): 22.9%
Shoulder block:
  Tire circumferential length L2: 25 mm
  Tire axial width W2: 17 mm
  Aspect ratio (L2/W2): 147%
  Ratio (W2/TWe): 9.7%
Middle block:
  Tire circumferential length L3: 24 mm
  Tire axial width W3: 20 mm
  Aspect ratio (L3/W3): 120%
  Ratio (W3/TWe): 11.4%

A test method was as follows:

<Traction Performance, Braking Performance, and Turning Performance when a Motorcycle Travels Straight>

Each sample tire was fixed to the above rim and filled with internal pressure (front wheel: 80 kPa, rear wheel: 80 kPa). The tire was mounted on a motorcycle of 250 cc displacement. Then, the traction performance, the braking performance, and the turning performance (corner grip, slide control performance) when an actual motorcycle ran on a test course of irregular road surface traveling straight were rated with a 10-point method, based on a driver's sensory rating. The larger a numeric value is, the better the performance is.

Table 1 shows test results.

TABLE 1

| | Comparative example 1 | Example 1 | Example 2 | Example 3 | Example 4 | Example 5 | Example 6 | Example 7 | Example 8 |
|---|---|---|---|---|---|---|---|---|---|
| Development view showing shift blocks | FIG. 5 | FIG. 2 | FIG. 2 | FIG. 2 | FIG. 2 | FIG. 2 | FIG. 2 | FIG. 2 | FIG. 2 |
| The amount of circumferential shift of shift blocks W6 (mm) | — | 0.5 | 4.0 | 10.0 | 4.0 | 4.0 | 4.0 | 4.0 | 4.0 |
| Groove depth D2 of slit (mm) | — | 5 | 5 | 5 | 1 | 8 | 5 | 5 | 5 |
| Width W4 of slit (mm) | — | 6 | 6 | 6 | 6 | 6 | 1 | 12 | 6 |
| Ratio (W6/L1) (%) | — | 2.5 | 20.0 | 50.0 | 20.0 | 20.0 | 20.0 | 20.0 | 20.0 |
| Ratio (D2/D1) (%) | — | 33.3 | 33.3 | 33.3 | 6.7 | 53.3 | 33.3 | 33.3 | 33.3 |
| Ratio (W4/W1) (%) | — | 15.0 | 15.0 | 15.0 | 15.0 | 15.0 | 2.5 | 30.0 | 15.0 |
| Number of shift blocks Gs (blocks) | — | 16 | 16 | 16 | 16 | 16 | 16 | 16 | 10 |
| Number of first shift blocks Gs1 (blocks) | — | 8 | 8 | 8 | 8 | 8 | 8 | 8 | 5 |

TABLE 1-continued

| | | | | | | | | |
|---|---|---|---|---|---|---|---|---|
| Number of second shift blocks Gs2 (blocks) | — | 8 | 8 | 8 | 8 | 8 | 8 | 8 | 5 |
| Number of parallel blocks Gp (blocks) | — | 8 | 8 | 8 | 8 | 8 | 8 | 8 | 14 |
| Total number of crown blocks Gt (blocks) | — | 24 | 24 | 24 | 24 | 24 | 24 | 24 | 24 |
| Ratio (Gs/Gt) (%) | — | 66.7 | 66.7 | 66.7 | 66.7 | 66.7 | 66.7 | 66.7 | 41.7 |
| Ratio (Gs1/Gs2) (%) | — | 100 | 100 | 100 | 100 | 100 | 100 | 100 | 100 |
| Tire axial length L6b of small block segments of shift blocks (mm) | — | 22 | 22 | 22 | 22 | 22 | 22 | 22 | 22 |
| Tire axial length L6a of small block segments of parallel blocks (mm) | — | 16 | 16 | 16 | 16 | 16 | 16 | 16 | 16 |
| Ratio (L6b/L6a) (%) | — | 138 | 138 | 138 | 138 | 138 | 138 | 138 | 138 |
| Presence or absence of chamfered portion of external corner | Absent | Present | Present | Present | Present | Present | Present | Present | Present |
| Chamfering length L7 of chamfered portion (mm) | — | 3 | 3 | 3 | 3 | 3 | 3 | 3 | 3 |
| Traction performance (10-point method) [The larger, the better.] | 5 | 5 | 5 | 4 | 5 | 4 | 5 | 4 | 5 |
| Braking performance (10-point method) [The larger, the better.] | 5 | 5 | 5 | 4 | 5 | 4 | 5 | 4 | 5 |
| Turning performance (corner grip) (10-point method) [The lager, the better.] | 5 | 5 | 8 | 7 | 6 | 6 | 5 | 6 | 7 |
| Turning performance (slide control performance) (10-point method) [The larger, the better. | 5 | 6 | 8 | 7 | 6 | 7 | 6 | 6 | 7 |

| | Example 7 | Example 8 | Example 9 | Example 10 | Example 11 | Example 12 | Example 13 | Example 14 | Example 15 |
|---|---|---|---|---|---|---|---|---|---|
| Development view showing shift blocks | FIG. 2 | FIG. 2 | FIG. 2 | FIG. 2 | FIG. 2 | FIG. 2 | FIG. 2 | FIG. 2 | FIG. 2 |
| The amount of circumferential shift of shift blocks W6 (mm) | 4.0 | 4.0 | 4.0 | 4.0 | 4.0 | 4.0 | 4.0 | 4.0 | 4.0 |
| Groove depth D2 of slit (mm) | 5 | 5 | 5 | 5 | 5 | 5 | 5 | 5 | 5 |
| Width W4 of slit (mm) | 12 | 6 | 6 | 6 | 6 | 6 | 6 | 6 | 6 |
| Ratio (W6/L1) (%) | 20.0 | 20.0 | 20.0 | 20.0 | 20.0 | 20.0 | 20.0 | 20.0 | 20.0 |
| Ratio (D2/D1) (%) | 33.3 | 33.3 | 33.3 | 33.3 | 33.3 | 33.3 | 33.3 | 33.3 | 33.3 |
| Ratio (W4/W1) (%) | 30.0 | 15.0 | 15.0 | 15.0 | 15.0 | 15.0 | 15.0 | 15.0 | 15.0 |
| Number of shift blocks Gs (blocks) | 16 | 10 | 20 | 15 | 16 | 16 | 16 | 16 | 16 |
| Number of first shift blocks Gs1 (blocks) | 8 | 5 | 10 | 5 | 8 | 8 | 8 | 8 | 8 |
| Number of second shift blocks Gs2 (blocks) | 8 | 5 | 10 | 10 | 8 | 8 | 8 | 8 | 8 |
| Number of parallel blocks Gp (blocks) | 8 | 14 | 4 | 9 | 8 | 8 | 8 | 8 | 8 |
| Total number of crown blocks Gt (blocks) | 24 | 24 | 24 | 24 | 24 | 24 | 24 | 24 | 24 |
| Ratio (Gs/Gt) (%) | 66.7 | 41.7 | 83.3 | 62.5 | 66.7 | 66.7 | 66.7 | 66.7 | 66.7 |
| Ratio (Gs1/Gs2) (%) | 100 | 100 | 100 | 50 | 100 | 100 | 100 | 100 | 100 |
| Tire axial length L6b of small block segments of shift blocks (mm) | 22 | 22 | 22 | 22 | 16 | 24 | 22 | 22 | 22 |
| Tire axial length L6a of small block segments of parallel blocks (mm) | 16 | 16 | 16 | 16 | 16 | 24 | 16 | 16 | 16 |
| Ratio (L6b/L6a) (%) | 138 | 138 | 138 | 138 | 100 | 150 | 138 | 138 | 138 |
| Presence or absence of chamfered portion of external corner | Present | Present | Present | Present | Present | Present | Absent | Present | Present |
| Chamfering length L7 of chamfered portion (mm) | 3 | 3 | 3 | 3 | 3 | 3 | — | 1 | 5 |
| Traction performance (10-point method) [The larger, the better.] | 4 | 5 | 4 | 3 | 4 | 4 | 6 | 5 | 4 |
| Braking performance (10-point method) [The larger, the better.] | 4 | 5 | 4 | 3 | 4 | 4 | 5 | 5 | 4 |
| Turning performance (corner grip) (10-point method) [The lager, the better.] | 6 | 7 | 9 | 7 | 8 | 8 | 6 | 7 | 8 |
| Turning performance (slide control performance) (10-point method) [The larger, the better. | 6 | 7 | 9 | 7 | 8 | 8 | 6 | 7 | 8 |

As a result of the tests, it could be confirmed that the tire of the Examples could improve the turning performance while maintaining the traction performance or the braking performance when the motorcycle traveled straight.

What is claimed is:

1. A motorcycle tire for rough terrain comprising a tread portion provided with a plurality of blocks, said blocks including:
crown blocks arranged in a center area of the tread portion,
middle blocks arranged axially outside the crown blocks,
shoulder blocks arranged axially outside middle blocks, and
parallel blocks arranged between the crown blocks, each parallel block including one circumferentially extending slit that divides each parallel block into two small block segments which are not shifted from each other in the tire circumferential direction, wherein the crown block aspect ratio is smallest and the shoulder block aspect ratio is largest among the blocks, the block aspect ratio being defined as a ratio (L/W) of the circumferential length L to the axial width W of the block, the crown blocks each include one circumferentially extending slit that divides each block into two small block segments, the slit having a groove depth in a range of from 5% to 40% of the radial height of the crown block, the two small block segments are shifted in opposite directions from each other in the tire circumferential direction, and the number of crown blocks is 66.7% to 90% of the total number of crown blocks and parallel blocks.

2. The motorcycle tire for rough terrain according to claim 1, wherein circumferentially extending inner edges of tread surfaces of the two small block segments are circumferentially shifted from each other.

3. The motorcycle tire for rough terrain according to claim 1, wherein the axially extending edge of one of the two small block segments is shifted in the opposite circumferential direction from the corresponding axially extending edge of the other small block segment.

4. The motorcycle tire for driving on rough terrain according to claim 1, wherein
the crown blocks have a tread surface and a block wall surface extending radially inwardly from the tread surface and defining a block contour, and
the block wall surface includes lateral wall surfaces disposed on both sides, in the tire circumferential direction, of one of the two small block segments and radially inner edges of the lateral wall surfaces of one of the two small block segments that are circumferentially shifted from radially inner edges of the lateral wall surfaces of the other small block segment.

5. The motorcycle tire for rough terrain according to claim 1, wherein the amount of circumferential shift between the two small block segments is 10% to 35% of the circumferential length of the crown block.

6. The motorcycle tire for rough terrain according to claim 1, wherein the crown blocks each have an axial width of 20 to 40% of a developed width of the tread portion.

7. The motorcycle tire for rough terrain according to claim 1, wherein the aspect ratio of each said crown block is 30 to 70%.

8. The motorcycle tire for rough terrain according to claim 1, wherein
each of said two small block segments includes an external corner with a chamfered portion, and
the external corner is disposed between an axially extending edge of the tread surface of the small block segment and a circumferentially extending inner edge of the tread surface adjacent to the slit.

9. The motorcycle tire for rough terrain according to claim 1, wherein the circumferential length of each of the two small block segments gradually increases in an axially outer direction from the slit.

10. The motorcycle tire for rough terrain according to claim 1, wherein the two small block segments of different crown blocks are shifted in different circumferential directions.

11. The motorcycle tire for rough terrain according to claim 10, wherein crown blocks having different circumferential shifts are adjacent to each other or adjacent to parallel blocks.

12. The motorcycle tire for rough terrain according to claim 1, wherein the tread portion includes concave portions located between circumferentially adjacent crown blocks.

13. The motorcycle tire for rough terrain according to claim 1, wherein the slit has a U-shape cross section.

14. The motorcycle tire for rough terrain according to claim 1, wherein the tire axial length of the small block segment of a crown block is larger than the tire axial length of the small block segment of a parallel block.

15. The motorcycle tire for rough terrain according to claim 14, wherein the tire axial length of the small block segment of a crown block is in a range of from 120% to 150% of the tire axial length of the small block segment of a parallel block.

16. The motorcycle tire for rough terrain according to claim 8, wherein the chamfered portion has a length in a range of from 1.0 mm to 5.0 mm.

17. The motorcycle tire for rough terrain according to claim 2, wherein an axially extending edge of a tread surface of one of the two small block segments is shifted in the opposite circumferential direction from a corresponding axially extending edge of a tread surface of the other small block segment.

18. The motorcycle tire for rough terrain according to claim 1, wherein only the crown blocks and the parallel blocks are arranged in the center area of the tread portion.

* * * * *